Feb. 10, 1953 — L. A. PAZANDAK — 2,627,751
SEED SAMPLE DIVIDER
Filed July 27, 1950 — 2 SHEETS—SHEET 1

INVENTOR.
LOUIS A. PAZANDAK
BY
B. H. Braddock
ATTORNEY.

Feb. 10, 1953

L. A. PAZANDAK 2,627,751

SEED SAMPLE DIVIDER

Filed July 27, 1950

INVENTOR.
LOUIS A. PAZANDAK
BY
G. H. Braddock
ATTORNEY.

Patented Feb. 10, 1953

2,627,751

UNITED STATES PATENT OFFICE 2,627,751

SEED SAMPLE DIVIDER

Louis A. Pazandak, Minneapolis, Minn.

Application July 27, 1950, Serial No. 176,126

6 Claims. (Cl. 73—424)

The invention herein presents a machine adapted to be employed to divide a bulk of seed into separate quantities thereof smaller than the bulk in such manner that the seed constituting a small quantity separated from the bulk of seed will possess the same relative characteristics as did the seed of the bulk.

It is common practice in the testing of seed to break down a relatively large quantity thereof gathered or scooped-up at random into smaller quantities, to be employed as samples to be tested, intended to be representative of the seed of the relatively large quantity gathered or scooped-up. Manual selection of a small quantity seed "sample" from a bulk of seed and having the same relative size characteristics as the seed of the bulk to be representative thereof obviously is prohibitive, if not impossible, and apparatuses and machines now in use for dividing bulk seed into small quantity samples to be tested are not capable of operating to obtain samples which possess characteristics more than haphazardly representative of the characteristics of the seed of the bulk from which the samples are separated.

The object of the present invention is to provide a seed sample divider of new and improved construction capable of operating upon bulks or larger quantities of seed gathered or scooped-up at random to obtain smaller or sample quantities for testing purposes possessing relative size characteristics considerably more representative of the relative size characteristics of the seed of a bulk or larger quantity from which a smaller or sample quantity is taken than has heretofore been the case.

In the accompanying drawings forming a part of this specification,

Figure 1:
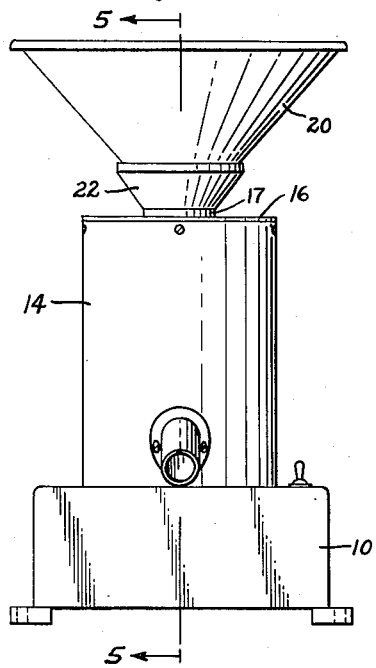
Fig. 1 is a side elevational view of a seed sample divider incorporating the features and characteristics of the invention.
Figure 2:
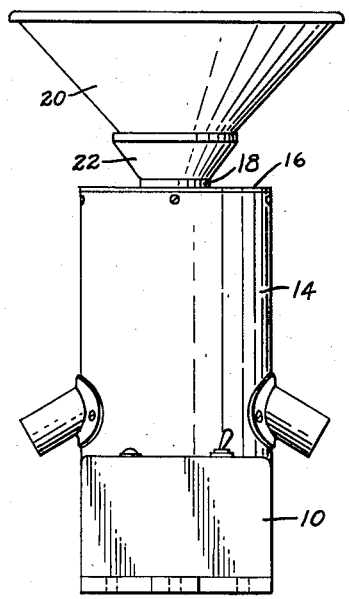
Fig. 2 is a front elevational view of said seed sample divider as it would appear from the right in Fig. 1.
Figure 3:
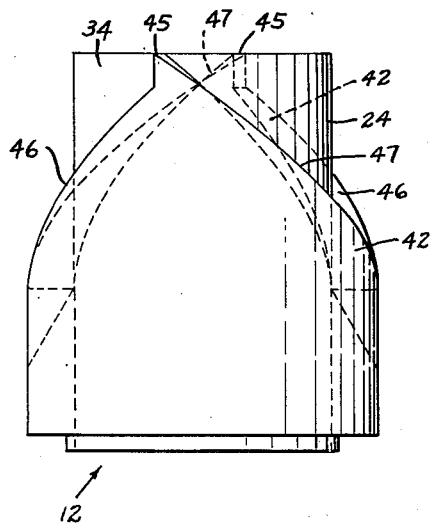
Fig. 3 is an enlarged elevational view of a seed dividing unit of the seed sample divider as it would appear when removed from the remainder of the machine.

With respect to the drawings and the numerals of reference thereon, a base 10 of the seed sample divider is constituted as a hollow rectilinear member to be rested upon a supporting surface (not shown) for the machine.

The base 10 rigidly supports, as at 11, a vertical seed dividing unit 12, of construction to be set forth, and also rigidly supports, as at 13, a comparatively large, vertical hollow cylindrical member 14 in surrounding relation to the seed dividing unit 12 and extending to position above the upper end of said seed dividing unit.

The upper end of the comparatively large cylindrical member 14 rigidly supports, as at 15, a horizontal wall 16 integral or rigid with a relatively small, vertical hollow cylindrical member 17 constituting a part of a seed mixing and agitating device of the seed sample divider. An upper portion 18 of the relatively small cylindrical member 17 extends to position above the horizontal wall 16, and a lower portion 19 of said relatively small cylindrical member extends to position below said horizontal wall to terminate in spaced relation to the upper end of the seed dividing unit 12.

A cone shape hopper 20 of the machine is suitably and conveniently supported, as at 21, upon an upwardly and outwardly flared extension 22 on the upper end of the relatively small cylindrical member 17 to be in vertical alinement with and open to the interior of said relatively small cylindrical member. An internal cylindrical bounding surface 23 of the relatively small cylindrical member 17 constitutes a seed guiding and directing surface of the mixing and agitating device of the machine.

The relatively small hollow cylindrical member 17 and the seed dividing unit 12 are in vertical alinement, and said seed dividing unit includes an external cylindrical bounding surface 24 which is in concentric relation to both the internal cylindrical bounding surface 23 of said relatively small hollow cylindrical member 17 and an internal cylindrical bounding surface 25 of the comparatively large hollow cylindrical member 14. The external cylindrical bounding surface 24 has circumference greater than that of said internal cylindrical bounding surface 23 and less than that of the internal cylindrical bounding surface 25. As disclosed, the external bounding surface 24 is disposed in closer relation to the circumference of the internal bounding surface 25 than to the circumference of the internal bounding surface 23.

The hollow base 10 suitably and conveniently supports an electric motor 26 with vertically upwardly extending driven shaft 27 suitably and conveniently mounted, as at 28, in a lower portion of a hollow central part of the seed dividing unit 12, and an intermediate portion of said driven shaft 27 fixedly supports, as at 29, a distributing and feed cup 30 of the seed sample divider. Said distributing and feed cup includes a lower, central downwardly extending cylindrical projection 31 at its under side fixed upon the driven shaft 27 and rotatably mounted, as at 32, in an upper portion of the hollow central part of said seed dividing unit, and a flat central portion 33 of said distributing and feed cup is horizontally disposed and situated in adjacent relation to a flat horizontal upper surface 34 of the seed dividing unit 12. The distributing and feed cup is a vessel the concave side of which faces upwardly. That is, the horizontal central portion 33 of said distributing and feed cup is of circular configuration and merges at its circumference in an upwardly and outwardly tapering, cone shape member 35. Said horizontal central portion 33 is directly beneath the relatively small hollow cylindrical member 17 in spaced relation thereto and vertical alinement therewith, and the cone shape member 35 is in spaced, surrounding relation to the lower end portion of said relatively small hollow cylindrical member. The upper, outer margin of said cone shape member 35 terminates in a horizontal plane at elevation above the lower end of the relatively small hollow cylindrical member 17 and below the elevation of the horizontal wall 16, and a vertical annular flange 36 of the distributing and feed cup extends downwardly from said upper, outer margin of the cone shape member 35. A lower end 37 of the vertical annular flange 36 is horizontally disposed and terminates in proximate relation to the flat horizontal upper surface 34 of the seed dividing unit 12, and an external bounding surface 38 of said vertical annular flange lies in the circumference of the external cylindrical bounding surface 24 of said seed dividing unit to in effect constitute an upper continuation thereof. The concave side of the distributing and feed cup is covered by a lining 39, of rubber as shown, fitted against the adjacent surfaces of the flat central portion 33 and the cup shape member 35 of said distributing and feed cup. While the concave side of the distributing and feed cup could be metal faced, it has been found desirable to line it with rubber, or other material which is a bit unsmooth.

The external cylindrical bounding surface 24 of the seed dividing unit 12 and the internal cylindrical surface 25 of the comparatively large cylindrical member 14 define or provide a first annular space 40 between said mentioned bounding surfaces in surrounding relation to the distributing and feed cup and to which the upper, concave side of said distributing and feed cup is open by way of a second annular space 41 defined or provided by the lower end portion of the relatively small hollow cylindrical member 17 and the upper, outer marginal end portion of the cone shape member 35.

The first annular space 40 is divided by a pair of upstanding partition walls, each denoted 42, into a pair of outlet passages, each indicated 43, for seed, and each outlet passage 43 leads to an outlet 44 through a lower portion of the comparatively large hollow cylindrical member 14. The outlets 44 are at diametrically opposite sides of said comparatively large hollow cylindrical member.

As disclosed, the upstanding partition walls 42 are constituted as integral parts of the seed dividing unit 12, and the upper end of each upstanding partition wall terminates in what can be termed a substantially horizontal, straight knife edge 45 disposed in the plane of the flat horizontal upper surface 34 of said seed dividing unit and extending between the external cylindrical bounding surface 24 and the internal cylindrical bounding surface 25 radially thereof. The knife edges 45 are in alined relation at diametrically opposite sides of the seed dividing unit. The distributing and feed cup is rotatable in the direction of the arrow in Fig. 4 in response to actuation of the electric motor 26, and downwardly sloping bounding surfaces 46 of the partition walls 42 at the forward sides of the outlets 44 slant more abruptly than do downwardly sloping bounding surfaces 47 at the rearward sides of said outlets. Each bounding surface 47 slants gently toward an outlet 44 to deliver seed thereto, and each bounding surface 46 is steep to arrest travel of delivered seed past and direct it to the corresponding outlet. It will be seen in said Fig. 4 that the knife edges 45 are closer to the forward sides of the outlets 44 than to the rearward sides thereof. This of course is because of the fact that the seed stop surfaces 46 are steeper or more abruptly slanted than are the seed delivery surfaces 47.

The upper end of the vertical driven shaft 27 fixedly supports a seed mixing and agitating element 48 constituted as a horizontal winged member situated centrally in a lower portion of the hopper 20 in spaced relation thereto immediately above the interior of the relatively small hollow cylindrical member 17 in concentric relation to its internal cylindrical bonding surface 23.

Figure 4:
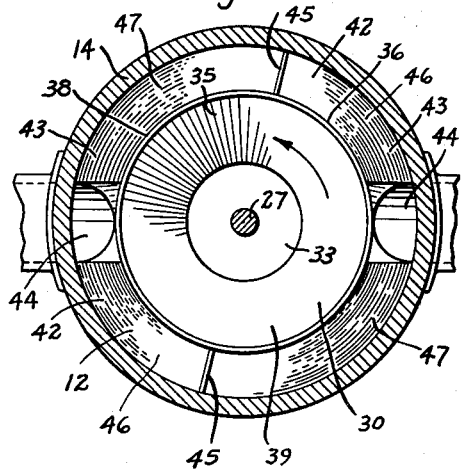
Fig. 4 is a horizontal sectional view, taken as on line 4—4 in Fig. 5.
Figure 5:
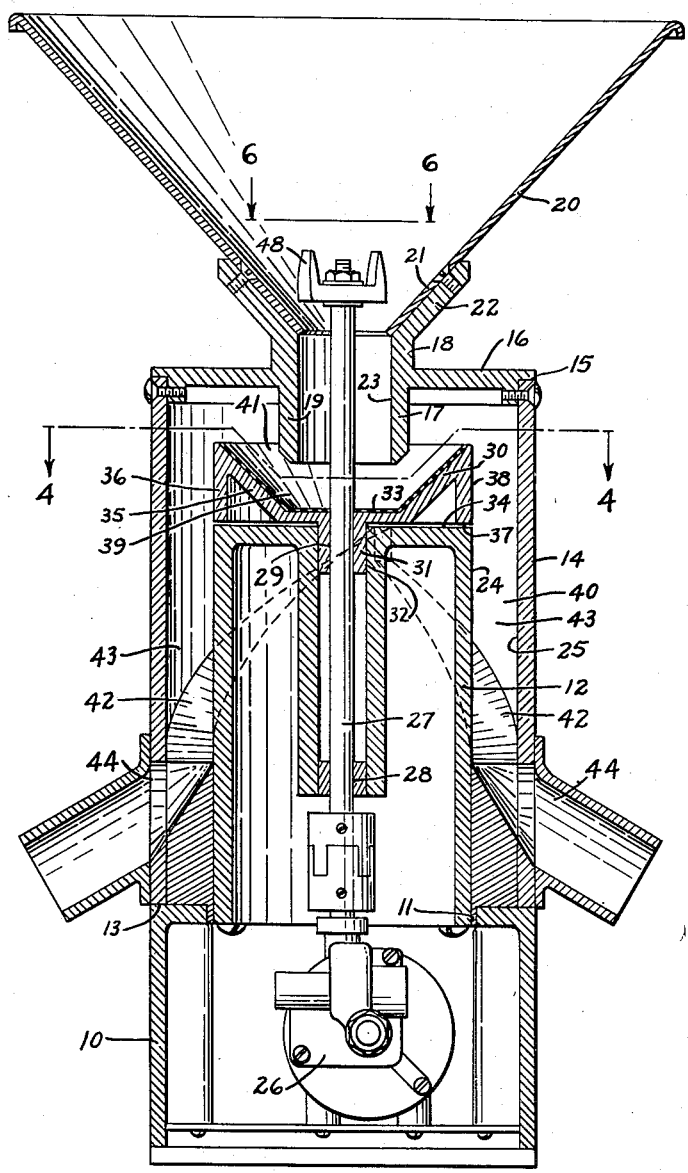
Fig. 5 is an enlarged central vertical sectional view, taken on line 5—5 in Fig. 1.
Figure 6:
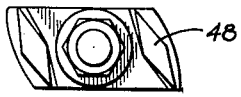
Fig. 6 is an enlarged plan view detailing a seed mixing and agitating element of the seed sample divider as it would appear from the position of line 6—6 in Fig. 5.

A bulk or quantity of seed to be divided is deposited into the hopper 20 and the electric motor 26 is made to operate to rotate the distributing and feed cup and the mixing and agitating element 48 as a unit, in the direction of the arrow in Fig. 4. Together, said mixing and agitating element 48 and the internal cylindrical surface 23 bounding the interior space of the relatively small hollow cylindrical member 17 constitute a seed mixing and agitating device of the seed sample divider. That is, the element 48 mixes and agitates the seed, and it is guided and directed to the distributing and feed cup by said internal cylindrical surface 23. The seed builds up in or on the distributing and feed cup substantially to the level of the upper, outer margin of its cone shape member 35, and remains at a fixed level as long as the electric motor 26 and the driven shaft 27 are inoperative. Upon ejection of seed from the distributing and feed cup, in response to its rotative movement, there will be concurrent feed of seed from the hopper 20 to said distributing and feed cup. It has been found by experiment and experience that the seed which enters the different outlet passages 43 and leaves the machine by way of the different outlets 44 is invariably equal in amount, and the quantity of seed emitted from each outlet 44 possesses size characteristics accurately representative of the size characteristics of the seed of the bulk or quantity which was divided. In commercial practice, the seed emitted from one or the other of the outlets 44 is replaced in the hopper, and the operation is successively repeated until a seed sample quantity of the desired size is obtained. In all cases, the resultant seed sample quantity, which could be one to two ounces of seed, more or less, for example, when the bulk of seed originally placed in the hopper was two pounds, more or less, is found to be considerably more representative of the relative size characteristics of the seed of the bulk from which the seed sample quantity was taken than has been the resultant seed sample quantity obtained in response to operation of machines now in use for accomplishing the same general result. The mixing and agitating device, constituted as the mixing and agitating element 48 and the internal cylindrical guiding and mixing surface 23, and the distributing and feed cup operate cooperatively to cause the seed to be conveyed from the hopper and delivered to the outlet passages 43, separated by the equally spaced knife edges 45, in such manner that the seed delivered to each outlet passage and emitted from its corresponding outlet 44 is the same in amount, as well as possessive of size characteristics accurately representative of those of the bulk or quantity of seed placed in the hopper to be divided.

What is claimed is:

1. A seed sample divider comprising a cylindrical member, a hollow member in spaced, surrounding relation to said cylindrical member providing therewith a continuous space, upstanding partition walls in said continuous space defined at their upper ends by knife edges disposed at diametrically opposite sides of said cylindrical member dividing the continuous space into a pair of separate outlet passages for seed disposed below said knife edges, a hollow cylindrical member above and in spaced vertical alinement with and including an internal cylindrical bounding surface in concentric relation to said cylindrical member, a distributing and feed cup between said cylindrical and hollow cylindrical members in concentric relation to each including a central lower portion, a cone shape wall extending upwardly and outwardly from said central lower portion in spaced relation to and terminating in a horizontal plane above a lower portion of said hollow cylindrical member and an external cylindrical bounding surface above and substantially in the circumference of an external bounding surface of said cylindrical member disposed interiorly of said upstanding partition walls, there being a continuous passage for seed from an upper, outer annular marginal portion of said cone shape wall of said distributing and feed cup to upper portions of said outlet passages, a hopper for delivery of seed to said distributing and feed cup by way of said hollow cylindrical member, a mixing and agitating element situated centrally in a lower portion of said hopper, and means for accomplishing rotation of said distributing and feed cup and said mixing and agitating element.

2. A seed sample divider comprising a cylindrical member, a hollow member in spaced, surrounding relation to said cylindrical member providing therewith an annular space, upstanding partition walls in said annular space defined at their upper ends by knife edges disposed at diametrically opposite sides of said cylindrical member dividing the annular space into a pair of separate outlet passages for seed disposed below said knife edges, a hollow cylindrical member above and in spaced, vertical alinement with and including an internal cylindrical bounding surface in concentric relation to said cylindrical member, a rotatably supported vertical shaft, a distributing and feed cup fixed upon said vertical shaft between said cylindrical and hollow cylindrical members in concentric relation to each including a central lower portion, a cone shape wall extending upwardly and outwardly from said central lower portion in spaced relation to and terminating in a horizontal plane above a lower portion of said hollow cylindrical member and an external cylindrical bounding surface above and in the circumference of an external bounding surface of said cylindrical member disposed interiorly of said upstanding partition walls, there being an annular passage for seed from an upper, outer marginal portion of said cone shape wall of said distributing and feed cup to upper portions of said outlet passages, a hopper above and open to said hollow cylindrical member for delivery of seed therethrough to an upper surface of the central portion of said distributing and feed cup, a mixing and agitating element fixed upon said vertical shaft and situated centrally of a lower portion of said hopper in spaced relation thereto, and means for rotating said vertical shaft together with said distributing and feed cup and said mixing and agitating element as a unit.

3. The combination as specified in claim 1 wherein upwardly facing surfaces of said distributing and feed cup are bounded by an unsmooth material.

4. The combination as specified in claim 1 wherein said hollow member extends to position above said cylindrical member, and said hollow cylindrical member is constituted as a part of a unit supported upon an upper portion of said hollow member.

5. The combination as specified in claim 1 wherein a lower portion of said external cylindrical bounding surface of said distributing and feed cup is in proximate relation to an upper portion of the external bounding surface of said cylindrical member.

6. The combination as specified in claim 1 wherein said knife edges are in a horizontal plane substantially at the elevation of the upper end of said cylindrical member.

LOUIS A. PAZANDAK.

REFERENCES CITED

The following references are of record in the file of this patent:

UNITED STATES PATENTS

| Number | Name | Date |
| --- | --- | --- |
| 518,915 | Clarkson | Apr. 24, 1894 |
| 573,610 | Moore | Dec. 22, 1896 |
| 682,528 | Calkins | Sept. 10, 1901 |
| 1,646,032 | Mason | Oct. 18, 1927 |